US012216659B2

(12) United States Patent
Barnes et al.

(10) Patent No.: US 12,216,659 B2
(45) Date of Patent: Feb. 4, 2025

(54) SYSTEM AND METHOD TO SUPPORT IN-ORDER MESSAGE PROCESSING WITH REACTIVE MICROSERVICES

(71) Applicant: Dell Products L.P., Round Rock, TX (US)

(72) Inventors: Michael Barnes, Doylestown, PA (US); Ashutosh P. Nanekar, Cary, NC (US); Dominique Prunier, Montreal (CA); Daniel A. Lottero, Milford, MA (US); Kshitij Patel, Cary, NC (US)

( * ) Notice: Subject to any disclaimer, the term of this patent is extended or adjusted under 35 U.S.C. 154(b) by 0 days.

(21) Appl. No.: 18/142,139

(22) Filed: May 2, 2023

(65) Prior Publication Data
US 2024/0370444 A1 Nov. 7, 2024

(51) Int. Cl.
*G06F 16/2455* (2019.01)
*G06F 16/2453* (2019.01)
*H04L 67/55* (2022.01)
*H04L 67/562* (2022.01)

(52) U.S. Cl.
CPC .. *G06F 16/24568* (2019.01); *G06F 16/24542* (2019.01); *H04L 67/55* (2022.05); *H04L 67/562* (2022.05)

(58) Field of Classification Search
CPC ......... G06F 16/24568; G06F 16/24542; H04L 67/55; H04L 67/562
See application file for complete search history.

(56) References Cited

U.S. PATENT DOCUMENTS

2023/0409375 A1* 12/2023 Beuzit ................... G06F 9/5072
2024/0048512 A1* 2/2024 S ............................. G06F 9/54

OTHER PUBLICATIONS

Jin et al. "Towards Low-Latency Batched Stream Processing by Pre-Scheduling", Mar. 2019, IEEE Transactions on Parallel and Distributed Systems, vol. 30, p. 1-13 (Year: 2019).*
Junqueira, Pravega: Rethinking Storage for Streams., Apr. 2020, p. 1-64 (Year: 2020).*
PB, Message Queue Partitioning in Kafka/RabbitMQ/SQS, Published Aug. 23, 2022, retrieved on May, 8, 2023 via url: <https://medium.com/systemdesign-us-blog/message-queue-partitioning-in-kafka-rabbitmq-sqs-cceb24f231eb>, p. 1-9 (Year: 2022).*
Wu et al., A Reactive Batching Strategy of Apache Kafka for Reliable Streaming Processing in Real-Time, 2020, 2020 IEEE 31 1• Ini ernational Symposium on Software Reliabiliry Engineering (ISSRE), p. 1-11 (Year: 2020).*

* cited by examiner

*Primary Examiner* — Schquita D Goodwin
*Assistant Examiner* — Joseph M Cousins
(74) *Attorney, Agent, or Firm* — Terrile, Cannatti & Chambers, LLP; Emmanuel A. Rivera

(57) ABSTRACT

A system, method, and computer-readable medium for processing in-order messages. A message broker is provided with unique message keys to performing in-order ensuring that a batch of messages are sent on the same message broker partition or data flow. A reactive generic data streaming processor provides a parallel data stream uniquely grouped to each message broker partition or data flow. In-order processing is maintained on each parallel data stream by using downstream publishers that preserve strict order in each data stream. A terminal sync message with a unique message key to identifies end of in-order streaming a message group.

20 Claims, 4 Drawing Sheets

SYSTEM AND METHOD TO SUPPORT IN-ORDER MESSAGE PROCESSING WITH REACTIVE MICROSERVICES

BACKGROUND OF THE INVENTION

Field of the Invention

The present invention relates to product support services. More specifically, embodiments of the invention provide a system, method, and computer-readable medium for processing in order data/information received as messages.

Description of the Related Art

Products, such as computer hardware (e.g., laptop computers, network servers, data storage, power supplies, etc.), can be implemented to send telemetry data/information as messages. The messages can be received by a service that processes the messages to make determination as to health and status of the products.

Typically, such messages are sent out as relatively large bulk files/payload files (e.g., greater than 1 GB). Ideally, to avoid having to parse and process such large bulk files, the messages can be streamed as smaller files (e.g., less than 2 MB); however, there are issues with streaming and processing of smaller files. Streaming of smaller files becomes more complicated with reactive programming, where the order of the files cannot be guaranteed due to asynchronous code, such as on event loops with callback, and back pressure. Out of order message flows can be equivalent to data/information loss. Reactive programming enhances throughput and enables efficient data streaming and data stream processing; however, message order can become difficult since the underlying framework(s) may not be synchronous.

Typical in-order message processing with message brokers can involve complex transaction implementations that can impact throughput since all messages must be received and committed before a transaction can be recorded. This can be quite cumbersome when the number of messages in a transaction is in the range of tens to hundreds of thousands.

SUMMARY OF THE INVENTION

A computer-implementable method, system and computer-readable storage medium for processing in-order messages comprising performing in-order messaging within a message broker with unique message keys that ensure each batch of messages are sent on the same message broker partition; —providing through a reactive generic data streaming processor, parallel data stream uniquely grouped to each message broker partition; —maintaining in-order processing on each parallel data stream by using downstream publishers that preserve strict order in each data stream; and—providing a terminal sync message with a unique message key to identify end of in-order streaming a message group.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Implementations herein provide for a methodology integrating reactively programmed microservice applications with a message broker (e.g., KAFKA®, PRAVEGA®, PULSAR®, etc.), assuring in order stream processing according to defined constraints (e.g., user-defined). In-order processing can be applied as needed and end-to-end data stream processing can be optimized. The streaming and processing of smaller message files (e.g., less than 2 MB) rather than larger message files (e.g., 128 MB) can avoid the use of performance-reducing transactions such as parsing and processing of large message files, which avoids "all or nothing" commits, and consumes considerable memory and computing resources.

Implementations provide for the use of a universal streaming and pluggable architecture generic data streaming (GDS) infrastructure with a series of microservices (e.g., pluggable components). This architecture can be used in place of batch GDS infrastructures. Groups of messages, which typically are processed as a batch, are processed in order through the series of microservices, such as through a distributed event store and stream-processing platform such as KAFKA®, PRAVEGA®, PULSAR®, etc. Notification can be provided when a batch is completed in a stream.

In specific, the following can be performed. In-order messaging is performed within a message broker (e.g., KAFKA®, PRAVEGA®, PULSAR®, etc.) with unique message keys to ensure that each batch of messages is sent in-order on the same message broker (e.g., KAFKA®, PRAVEGA®, PULSAR®, etc.) partition or data flow. A reactive GDS processor (e.g., microservice) provides a parallel data stream/reactive publisher that is uniquely grouped to each message broker (e.g., KAFKA®, PRAVEGA®, PULSAR®, etc.) partition or data flow. In-order processing is maintained on each parallel data stream/reactive publisher by using downstream (mapping) publishers that preserve strict order in each stream. A terminal sync message can be sent with a unique KAFKA®, PRAVEGA®, PULSAR®, etc. message keys to identify the end of the in-order streaming message group. When the sync message is received, database insertions, modifications and deletions can be enabled according to specifics of the message group and the terminal sync message.

Figure 1:
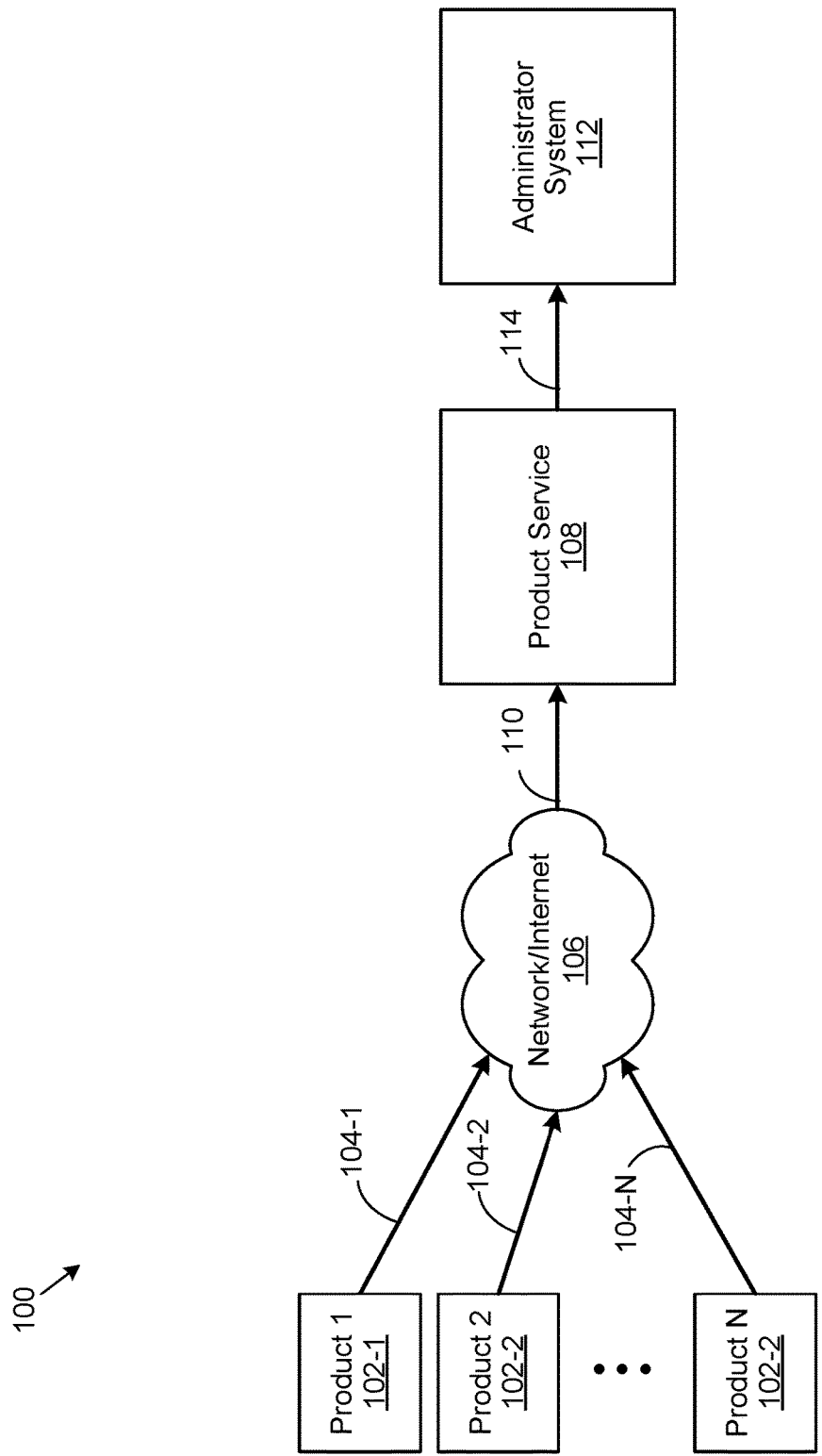
FIG. 1 is a general illustration of a system for processing in order data/information received as messages.

FIG. 1 is a general illustration of a system 100 for processing in order data/information received as messages. The system 100 includes multiple products 102-1 to 102-N. Products 102 can include computer hardware (e.g., laptop computers, network servers, data storage, power supplies, etc.). Implementations provide for products 102 to be configured to send their respective telemetry data 104. Telemetry data 104 can be sent out over a specific period of time (e.g., every hour), and can include data/information in the form of message files. Message files can be specific to volumes related to particular products 102. Data/information in the message files can include I/O processed, disk storage, memory storage, etc. of products 104. In certain implementations a payload file includes the message files.

System 100 includes network 106. Network 106 can include one or more wired and wireless networks, including the Internet. The telemetry data 104 is sent through the network 106. A product service 108 receives telemetry data 104 in the form of payload files 110. Product service 108 can be implemented as a cloud computing service, as one or more information handling systems (e.g., one or more servers), etc.

The product service 108 processes messages/payload files 110 to make determination as to health and status of the products 102. The product service 108, as further described herein, is configured to process payload files 110. In particular, payload files 110 can be relatively large files (e.g., greater than 1 GB), and are parsed out for further processing by product service 108.

The system 100 can include an administrator system 112. Implementations provide for the administrator system 112 to be included in product service 108. The administrator system 112 is configured to receive data/information 114 from the product service 108. In particular, as further described herein, data/information 114 can include product 104 information as gathered by product service 108, and specific change event information as to the products 104.

Figure 2:
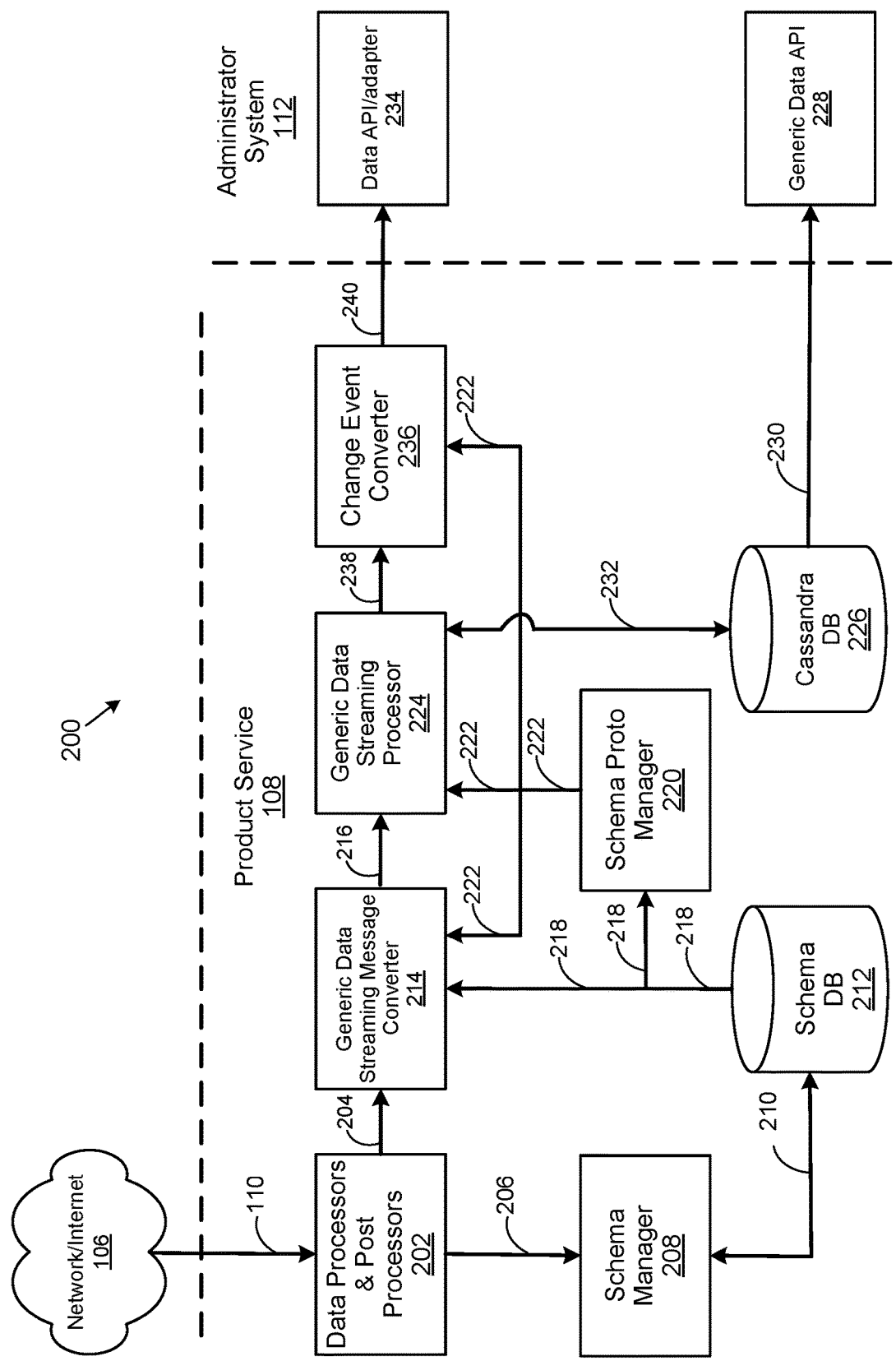
FIG. 2 is a general illustration of product service system for processing large and small files for in order message processing with reactive micro-services.

FIG. 2 is a general illustration of a system 200 for product service 108 for processing large and small files for in order message processing with reactive micro-services. The elements of system 200 can be implemented as components, applications, microservices, etc.

Implementations provide for reactive stream processing of large message groups with special coding precautions, such as use of concatMap which preserves the order of items/messages, rather than the more typical flatMap, to ensure messages are produced or sent to a message broker (e.g., KAFKA®, PRAVEGA®, PULSAR®, etc.) broker in order as appropriate. Special sync and complete messages are created to indicate the completion of in-order message processing group, where every message in a group utilizes the same key (e.g., KAFKA®, PRAVEGA®, PULSAR®, etc.) coded to a systemId and objectType specific to product service 108.

Implementations provide for product service 108 to include data processors and post processors 202 that receive payload files 110. Data processors and post processors 202 can be configured to receive large (e.g., greater than 1 GB) payload files 110 which are based on certain file based protocols. The data processors and post processors 202 read, process, and parse the payload files 110.

In particular, data processors and post processors 202 transform the data/information, or act as a message broker. For example, RABBITMQ® message brokering can be implemented, and data processors and post processors 202 send RABBITMQ®/advanced message queuing protocol (AMQP) messages 204. In addition, data processors and post processors 200 can process and post schema information 206 as to products 104, such as volumes and volume groups. The schema information 206 may be sent over a http post request. A volume can include a name, capacity, etc. For example, the RABBITMQ®/AMQP messages 204 include information as to volumes of products 104.

The schema information 206 is used to interpret the volumes in RABBITMQ®/AMQP messages 204. Schema information 206 is sent to a schema manager 208. The schema manager 208 processes schema information 206 as schema metadata 210. The metadata 210 is related to the RABBITMQ®/AMQP messages 204. The schema manager 208 can persist the schema metadata 210 to schema database 212. Communication can be through Structured Query Language (SQL) between schema manager 208 and schema database 212.

The RABBITMQ®/AMQP messages 204 are received by a generic data streaming converter 214. The RABBITMQ®/AMQP messages 204 are relatively large (e.g., 128 MB) and are broken up by generic data streaming converter 214 into smaller messages. Sending smaller messages do not require continuous storage and be more memory efficient. Such smaller messages may be implemented as KAFKA®, PRAVEGA®, PULSAR®, etc. messages. KAFKA®, PRAVEGA®, PULSAR®, etc. being optimized to send smaller messages. The generic data streaming converter 214 acts as a KAFKA®, PRAVEGA®, PULSAR®, etc. message broker. The smaller messages are sent out as KAFKA®, PRAVEGA®, PULSAR®, etc. messages 216. In-order messaging within generic data streaming converter 214 acting as a KAFKA®, PRAVEGA®, PULSAR®, etc. message broker can be achieved with unique message keys that ensure each batch of messages is sent in-order on the same message broker (e.g., KAFKA®, PRAVEGA®, PULSAR®, etc.) partition or data flow. A terminal sync message can be sent with a unique message key to identify end of an in-order streaming message group. When a sync message is received, database insertions can be performed, modifications and deletions enabled according to specifics of the message group and the terminal sync message.

The schema database 212 provides schema metadata in a particular format 218 to the generic data streaming converter 214 and a schema proto manager 220. Communication can be through SQL between schema database 212, generic data streaming converter 214, and schema proto manager 220.

GOOGLE® Protocol Buffers or GOOGLE® Protobuf is a cross platform format is used to serialize structured data. GOOGLE® Protobuf is useful in developing programs to communicate with each other over a network or for storing data. KAFKA®, PRAVEGA®, PULSAR®, etc. messages (e.g., KAFKA®, PRAVEGA®, PULSAR®, etc. messages 216) are serialized per the GOOGLE® Protobuf format.

Implementations provide for the schema proto manager 220 to receive schema metadata 218 from schema database 212 in the format as originally presented, and generate declarations 222 that allow serializing/deserializing of KAFKA®, PRAVEGA®, PULSAR®, etc. messages (e.g., KAFKA®, PRAVEGA®, PULSAR®, etc. messages 216). In particular, the generic data streaming converter 214 consults/receives declarations 222 from schema proto manager 220 to serialize KAFKA®, PRAVEGA®, PULSAR®, etc. messages 216.

Implementations provide for a reactive generic data stream processor 224 to receive KAFKA®, PRAVEGA®, PULSAR®, etc. messages 216, and receive declarations 222 that allow serializing/deserializing of KAFKA®, PRAVEGA®, PULSAR®, etc. messages (e.g., KAFKA®, PRAVEGA®, PULSAR®, etc. messages 216). The generic data stream processor 224 can include a reactive consumer message listener (not shown) which receives the KAFKA®, PRAVEGA®, PULSAR®, etc. messages 216, and creates separate reactive publishers (i.e., data streams) for each KAFKA®, PRAVEGA®, PULSAR®, etc. message 216 in order and partitioned as to KAFKA®, PRAVEGA®, PULSAR®, etc. message broker (generic data streaming converter 214). Furthermore, separate threads may be used to enable parallelism and prevent one in-order data flow from impacting the throughput of other parallel data flows.

Special coding precautions (e.g., use of concatMap rather than flatMap) are implemented to ensure that messages are consumed and processed in-order on each of the parallel data flows. KAFKA®, PRAVEGA®, PULSAR®, etc. message brokers can only guarantee in order message processing for data written to a specific KAFKA®, PRAVEGAR, PULSAR®, etc. topic with a specific KAFKA®, PRAVEGA®, PULSAR®, etc. key. Implementations provide that all messages that are written to a KAFKA®, PRAVEGA®, PULSAR®, etc. broker where order is preserved are written to a KAFKA®, PRAVEGA®, PULSAR®, etc. key that includes a product service 108 SystemID and a data objectType. The message order in the KAFKA®, PRAVEGA®, PULSAR®, etc. broker can also be preserved upon retries/failures with appropriate settings in the microservice (data processors and post processors 202) that sends the messages to the KAFKA®, PRAVEGA®, PULSAR®, etc. message broker (generic data streaming converter 214).

The reactive generic data stream processor 224 acts as a microservice that provides parallel data streams or reactive publishers uniquely grouped to each (message broker (e.g., KAFKA®, PRAVEGA®, PULSAR®, etc.) partition or data flow. In-order processing can be maintained on each parallel data stream or reactive publisher by using downstream (mapping) publishers that preserve strict order in each data stream.

The generic data stream processor 224 can communicate with a CASSANDRA® database 226. The CASSANDRA®database 226 is an open source NoSQL distributed database. Communication between the generic data stream processor 224 and CASSANDRA®database 226 is through CASSANDRA®Query Language (CQL).

The CASSANDRA®database 226 includes all the data/information that has been received from products 104. A generic data application program interface (API) 228 receives product data/information 230 from the CASSANDRA®database 226 sent through CQL. In certain implementations, the generic data API 228 is used by administrator system 112. The generic data API 228 allows queries of the products 104. CASSANDRA®database 226 further provides data/information 232 to the generic data stream processor 224.

A data API/adapter 234 can keep a local cache of data similar to data in CASSANDRA®database 224. The local cache of data is formatted for faster access to allow for use cases such as for graphical user interface (GUI) to perform sorting, paging, etc.

Implementations provide for a change event converter 236. As data/information as to products 104 change (e.g., new disk added to a product), the CASSANDRA®database 226 receives the data/information (i.e., new/updated data/information). The generic data stream processor 224 receives KAFKA®, PRAVEGA®, PULSAR®, etc. messages 216 as to the updated data/information. The generic data stream processor 224 compares previously received KAFKA®, PRAVEGA®, PULSAR®, etc. messages 216 with the latest KAFKA®, PRAVEGA®, PULSAR®, etc. messages 216 as to products 104, and generates a KAFKA®, PRAVEGA®, PULSAR®, etc. message 238 as to change/update for a particular product. The change event converter 236 receives the KAFKA®, PRAVEGA®, PULSAR®, etc. message 238 and declarations 222 that allow serializing/deserializing of the KAFKA®, PRAVEGA®, PULSAR®, etc. message 238. The change event converter 236 converts Kafka, Pravega, Pulsar, etc. message 238 to a RABBITMQ®/AMQP message 240. The RABBITMQ®/AMQP message 240 is provided to and consumed by the data API/adapter 234.

Figure 3:
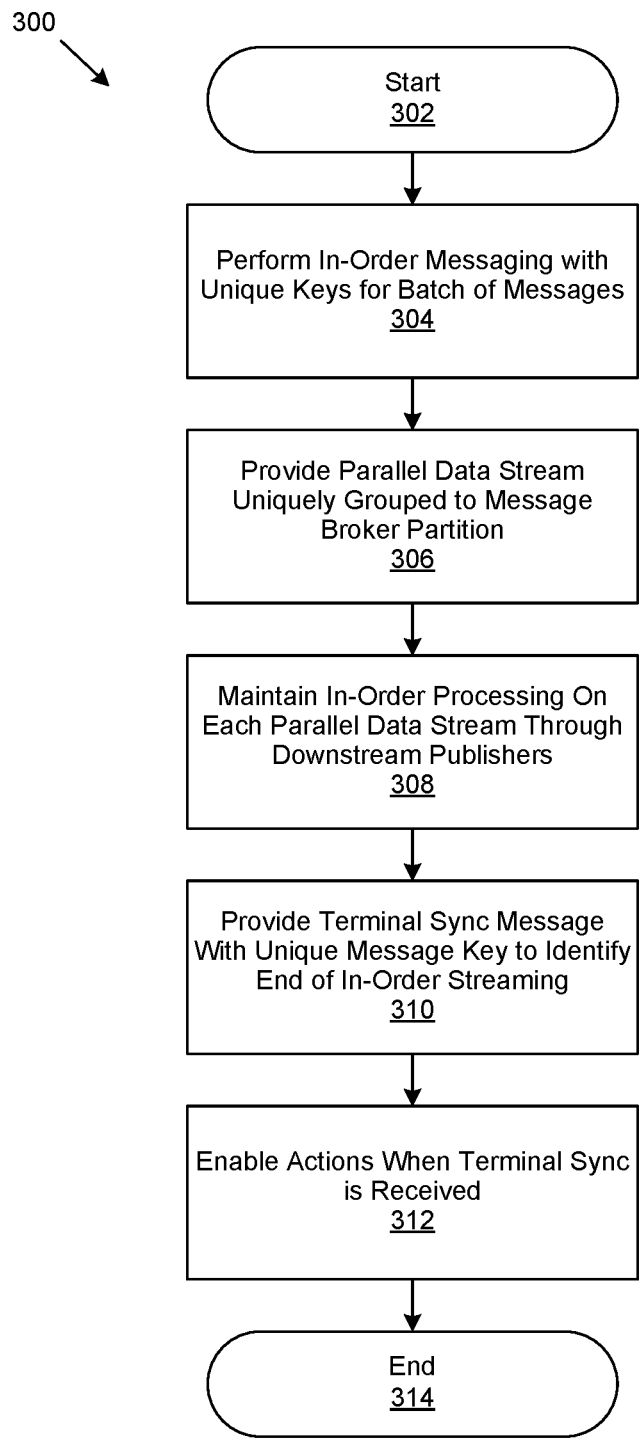
FIG. 3 is a generalized flowchart for processing in order data/information received as messages.

FIG. 3 is a generalized flowchart 300 for processing in order data/information received as messages. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 302 the process 300 starts. At step 304, in-order messaging is performed within message broker (e.g., KAFKA®, PRAVEGA®, PULSAR®, etc.) with unique message keys that can ensure that each batch of messages are sent on the same message broker (e.g., KAFKA®, PRAVEGA®, PULSAR®, etc.) partition or data flow.

At step 306, through a reactive generic data streaming processor, parallel data stream/reactive publisher is provided. The parallel data stream/reactive publisher is uniquely grouped to each data stream/reactive message publisher.

At step 308, in-order processing is maintained on each parallel data stream/reactive publisher by using downstream/mapping publishers that preserve strict order in each stream.

At step 310, a terminal sync message is provided with a unique message (e.g., KAFKA®, PRAVEGA®, PULSAR®, etc.) key to identify the end of the in-order streaming message group.

At step 312, when the terminal sync message is received, actions are enabled such as database insertions, and modifications and deletions according to specifics of the message group. At step 314, the process 300 ends.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 4:
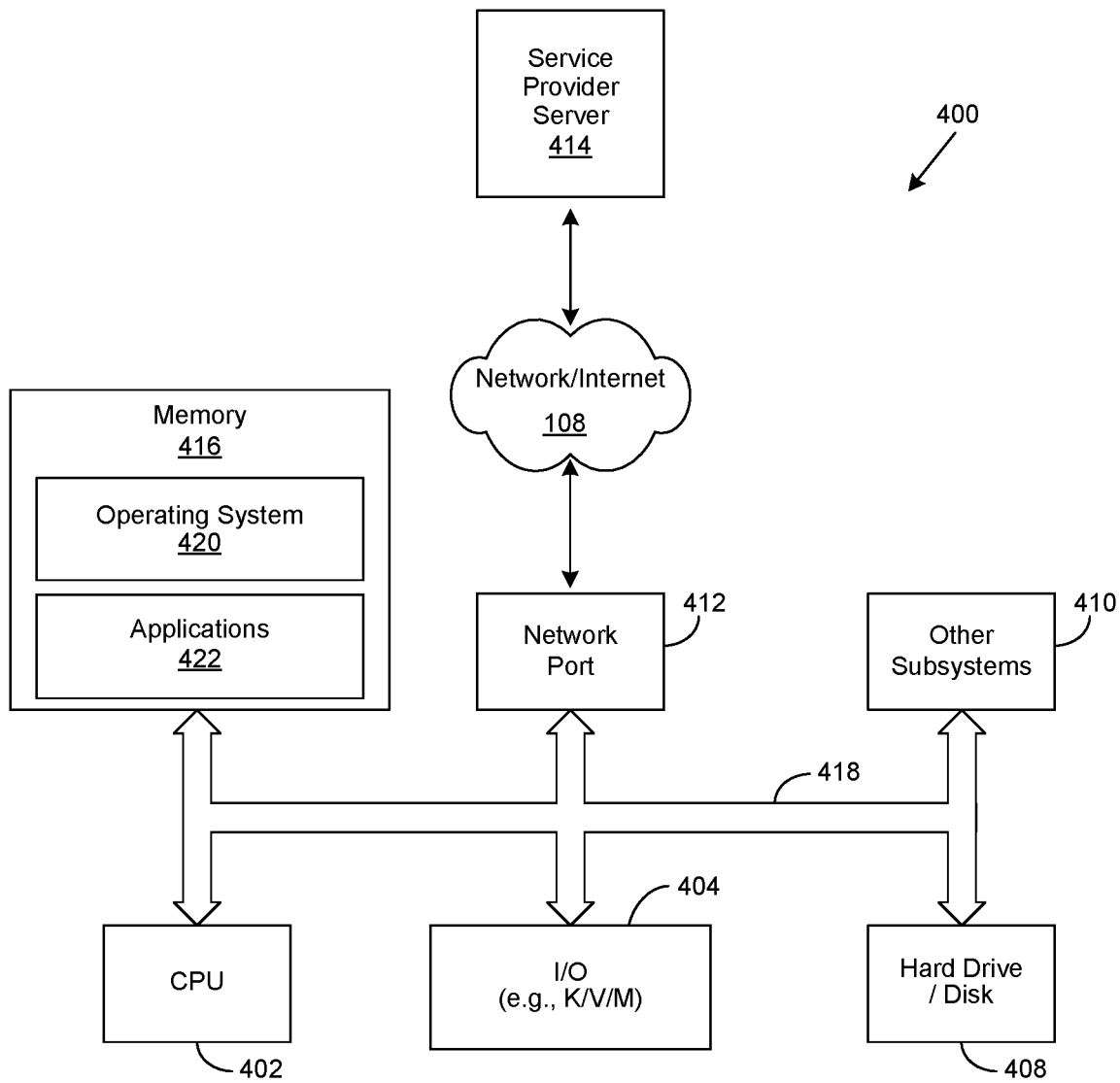
FIG. 4 is a general illustration of components of an information handling system as implemented in the present invention.

FIG. 4 is a generalized illustration of an information handling system 400 that can be used to implement the system and method of the present invention. The information handling system 400 can be implemented as a computing device, such as a network server, or multiple servers supporting a service/cloud service, such as product service 108. The information handling system 400 can also be computing devices of a cloud service that supports a service, such as product service 112.

The information handling system 400 includes a processor (e.g., central processor unit or "CPU") 402, input/output (I/O) devices 404, such as a microphone, a keyboard, a video/display, a mouse, and associated controllers (e.g., K/V/M).

The information handling system 400 includes a hard drive or disk storage 408, and various other subsystems 410. In various embodiments, the information handling system 400 also includes network port 412 operable to connect to the network 108 described herein, where network 108 can include one or more wired and wireless networks, including the Internet. Network 108 is likewise accessible by a service provider server 414.

The information handling system 400 likewise includes system memory 416, which is interconnected to the foregoing via one or more buses 418. System memory 416 can be implemented as hardware, firmware, software, or a combination of such. System memory 416 further includes an operating system (OS) 420. Embodiments provide for the system memory 416 to include applications 422. Applications 422 can be implemented as the components/microservices described herein.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as JAVA®, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Skilled practitioners of the art will recognize that many such embodiments are possible, and the foregoing is not intended to limit the spirit, scope or intent of the invention. Consequently, the invention is intended to be limited only by the spirit and scope of the appended claims, giving full cognizance to equivalents in all respects.

What is claimed is:

1. A computer-implementable method for processing in-order messages comprising:
    performing in-order messaging within a message broker with unique message keys that ensure each batch of messages are sent on the same message broker partition;
    providing through a reactive generic data streaming processor, parallel data stream uniquely grouped to each message broker partition by implementing coding precautions through concatMap to maintain the parallel data stream, wherein order is preserved through a key that includes SystemID and data objectType;
    maintaining in-order processing on each parallel data stream by using downstream publishers that preserve strict order in each data stream; and
    providing a terminal sync message with a unique message key to identify end of in-order streaming a message group.

2. The method of claim 1, wherein the message broker is one of a Kafka, Pravega or Pulsar message broker implemented as generic data streaming converter.

3. The method of claim 1, wherein the reactive generic data streaming processor includes a reactive consumer message listener which receives messages, and creates separate reactive data streams for each message broker message group.

4. The method of claim 1, wherein coding precautions are implemented to ensure that messages are consumed and processed in-order on each of parallel data flows.

5. The method of claim 1, wherein messages that are written to the message broker are written to a key that includes a system ID and a data object group.

6. The method of claim 1, wherein a schema manager provides declarations to the reactive generic data streaming processor as to the message groups.

7. The method of claim 1 further comprising enabling actions when the terminal sync message is received, wherein actions include database insertions, and modifications and deletions according to specifics of the message group.

8. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations for processing in-order messages executable by the processor and configured for:
performing in-order messaging within a message broker with unique message keys that ensure each batch of messages are sent on the same message broker partition;
providing through a reactive generic data streaming processor, parallel data stream uniquely grouped to each message broker partition by implementing coding precautions through concatMap to maintain the parallel data stream, wherein order is preserved through a key that includes SystemID and data objectType;
maintaining in-order processing on each parallel data stream by using downstream publishers that preserve strict order in each data stream; and
providing a terminal sync message with a unique message key to identify end of in-order streaming a message group.

9. The system of claim 8, wherein the message broker is one of a Kafka, Pravega or Pulsar message broker implemented as generic data streaming converter.

10. The system of claim 8, wherein the reactive generic data streaming processor includes a reactive consumer message listener which receives messages, and creates separate reactive data streams for each message group.

11. The system of claim 8, wherein coding precautions are implemented to ensure that messages are consumed and processed in-order on each of parallel data flows.

12. The system of claim 8, wherein messages that are written to the message broker are written to a key that includes a system ID and a data object group.

13. The system of claim 8, wherein a schema manager provides declarations to the reactive generic data streaming processor as to the message groups.

14. The system of claim 8 further comprising enabling actions when the terminal sync message is received, wherein actions include database insertions, and modifications and deletions according to specifics of the message group.

15. A non-transitory, computer-readable storage medium embodying computer program code for processing in-order messages, the computer program code comprising computer executable instructions configured for:
performing in-order messaging a within a message broker with unique message keys that ensure each batch of messages are sent on the same message broker partition;
providing through a reactive generic data streaming processor, parallel data stream uniquely grouped to each message broker partition by implementing coding precautions through concatMap to maintain the parallel data stream, wherein order is preserved through a key that includes SystemID and data objectType;
maintaining in-order processing on each parallel data stream by using downstream publishers that preserve strict order in each data stream; and
providing a terminal sync message with a unique message key to identify end of in-order streaming a message group.

16. The non-transitory, computer-readable storage medium of claim 15, wherein the message broker is one of a Kafka, Pravega or Pulsar message broker implemented as generic data streaming converter.

17. The non-transitory, computer-readable storage medium of claim 15, wherein the reactive generic data streaming processor includes a reactive consumer message listener which receives messages, and creates separate reactive data streams for each message group.

18. The non-transitory, computer-readable storage medium of claim 15, wherein coding precautions are implemented to ensure that messages are consumed and processed in-order on each of parallel data flows.

19. The non-transitory, computer-readable storage medium of claim 15, wherein messages that are written to the message broker are written to a key that includes a system ID and a data object group.

20. The non-transitory, computer-readable storage medium of claim 15 further comprising enabling actions when the terminal sync message is received, wherein actions include database insertions, and modifications and deletions according to specifics of the message group.

* * * * *